United States Patent [19]

Kim

[11] 4,455,236
[45] Jun. 19, 1984

[54] METHOD FOR REMOVING HYDROGEN SULFIDE FROM AQUEOUS STREAMS

[75] Inventor: Bang M. Kim, Schenectady, N.Y.

[73] Assignee: General Electric Company, Schenectady, N.Y.

[21] Appl. No.: 450,867

[22] Filed: Dec. 20, 1982

[51] Int. Cl.³ .............................................. C02F 1/72
[52] U.S. Cl. .................................. 210/721; 210/763; 210/916
[58] Field of Search ............... 210/668, 673, 719, 721, 210/758, 763, 916, 638; 423/573 R

[56] References Cited

U.S. PATENT DOCUMENTS

3,104,951  9/1963  Urban ............................. 423/573 R
4,076,621  2/1978  Hardison ........................... 210/758

FOREIGN PATENT DOCUMENTS

7310225  1/1974  Netherlands .................... 423/573 R

OTHER PUBLICATIONS

Kunin, *Ion Exchange Resins*, Robert E. Krieger, N.Y., 1972, pp. 97–98.
Electron Exchange-Polymers, III, Polymers and Co-polymers of Hydroquinone, (Myer Ezrin, Ivor H. Updegraff and Harold G. Cassidy, vol. 75, pp. 1610–1614, Journal of Americal Chemical Society, 1953.

*Primary Examiner*—Ivars C. Cintins
*Attorney, Agent, or Firm*—Lawrence D. Cutter; James C. Davis, Jr.; Marvin Snyder

[57] ABSTRACT

Waste water containing dissolved hydrogen sulfide is passed through a vessel containing redox resin which oxidizes the dissolved hydrogen sulfide to elemental sulfur which is removed from the waste water, preferably through filtration. The method of the present invention is also particularly desirable in that the redox-active resin may be restored to a high oxidation state by contacting the resin with an oxidizing fluid such as humidified air or oxygen. The restoration of the redox-active resin is particularly easy when the resin is disposed within a vessel as a membrane dividing the interior volume of the vessel into separate chambers: one chamber for the passage of the waste water and the other chamber for the passage of oxidizing fluid.

11 Claims, 2 Drawing Figures

METHOD FOR REMOVING HYDROGEN SULFIDE FROM AQUEOUS STREAMS

BACKGROUND OF THE INVENTION

The present invention relates to a method for removing hydrogen sulfide from waste water and in particular to a method employing redox resin material which can be used repeatedly as a result of continuous oxidation treatment.

Industrial waste water containing hydrogen sulfide presents a significant pollution problem because of its high toxicity and unpleasant odor even at low concentrations. The treatment of such waste water is necessary before discharging it to the environment so as to reduce the hydrogen sulfide content to acceptable levels. The present invention is aimed at developing a simple and effective method of performing the removal of hydrogen sulfide from such waste water streams.

In U.S. Pat. No. 4,076,621 issued Feb. 28, 1978 to I. C. Hardison, there is apparently disclosed a method of stripping hydrogen sulfide containing waste water with air and scrubbing the evolved gas with solutions containing iron chelate. The process which is described in this patent is a two stage process requiring a large equipment assembly for aeration of the waste water and a subsequent scrubbing operation. Spent chemicals employed in this process are neither recovered nor regenerated. Accordingly, this method requires high material costs because chemicals employed are spent and not recovered.

In the text "Physicochemical Processes for Water Quality Control" by N. J. Weber (Wiley-Interscience 1972) the direct production of sulfur from hydrogen sulfide in an aqueous phase is apparently disclosed using oxidizing agents such as potassium permanganate, $KMnO_4$. However, these oxidizing agents cannot be recovered, and accordingly, this method also requires high material costs and involves a potential pollution problem generated by the excess chemicals employed.

Accordingly, it is seen that it is desirable to provide a method for removing hydrogen sulfide from waste water or other aqueous streams by means of processes which do not require the use of expendable chemical quantities nor the use of chemicals which, when employed in excess of stoichiometric requirements, can produce a pollution problem of their own. It is also seen that a method for hydrogen sulfide removal is desirable in which materials employed can be recycled, reconditioned or restored to reduce the cost of the method which would otherwise be attributable to spent chemical materials.

SUMMARY OF THE INVENTION

In accordance with a preferred embodiment of the present invention, a method for removing hydrogen sulfide from waste water or other aqueous solutions comprises passing the solution through a vessel containing at least one redox resin material having a high oxidation state, so that the waste water and resin are contacted with one another so as to thereby oxidize the dissolved hydrogen sulfide to produce elemental sulfur which is separated from the resulting aqueous solution through a process such as filtration. Sulfate and other oxidized sulfur species may also be formed as oxidation by-products. In accordance with another embodiment of the present invention the redox resin material is employed as a membrane dividing the vessel into two volumes. The hydrogen sulfide containing waste water is passed through a first volume and an oxygenating fluid is passed through the second volume. In particular, the oxidizing fluid may simply comprise humidified air or oxygen itself. It is therefore accordingly seen that the instant method provides reusable materials for the oxidation of the dissolved hydrogen sulfide and it is efficient, effective and economical.

Accordingly, it is an object of the present invention to provide a method for removing hydrogen sulfide from waste water and other aqueous streams.

It is also an object of the present invention to provide a hydrogen sulfide removal method employing recyclable chemical materials which may be easily restored to a high oxidation state.

Furthermore, it is an object of the present invention to employ redox resin materials as a catalyst for the oxidation of hydrogen sulfide in dissolved aqueous solutions.

Lastly it is an object of the present invention to provide a process for the production of elemental sulfur.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
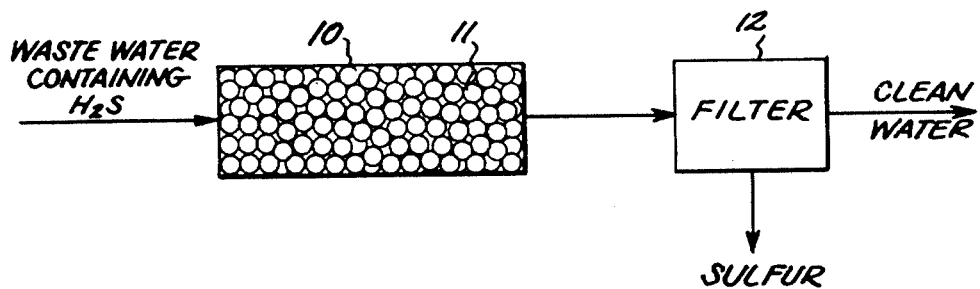
FIG. 1 is a schematic diagram illustrating the present invention.

FIG. 1 illustrates one embodiment of the present invention in which waste water containing hydrogen sulfide is passed through vessel 10 containing at least one redox resin material, preferably in the form of redox resin pellets 11. Waste water passed through vessel 10 is therefore brought in contact with the pellets which are preferably present in a high oxidation state so as to oxidize the dissolved hydrogen sulfide, thereby producing elemental sulfur which may be removed from the treated waste water solution by means of filter 12. However, other means for removing elemental sulfur may be employed. These means include centrifugation, floatation or sedimentation. However, the use of filters is preferred because of the high solid content, small space requirement and low cost of separation achieved by filtration.

After the oxidation process is complete, the spent redox resin pellets may be regenerated by passing oxygen or air through the chamber. In this way the resin pellets may be recycled and used repeatedly, thereby minimizing material costs for the processes of the present invention. To provide continuous operation, a plurality of vessels may be configured in a parallel arrangement so that some may be recharged as others are operating and vice versa.

Figure 2:
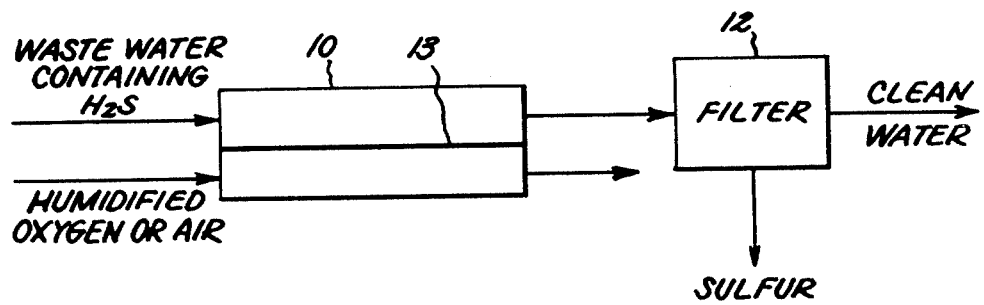
FIG. 2 is a schematic diagram illustrating an embodiment of the present invention employing a redox-active membrane.

Passing air and wastewater simultaneously through the bed containing redox resins is also a possible method for redox resin regeneration. Additionally, simultaneous oxidation of hydrogen sulfide and regeneration of the resin is possible through the use of redox-active membranes. A schematic diagram illustrating this process is shown in FIG. 2. In this diagram a redox-active membrane 13 is employed to divide vessel 10 into two volumes. Waste water containing hydrogen sulfide is passed through one of these volumes while humidified oxygen or air or other oxidizing fluid is passed through the other volume so that these two fluid streams contact opposite sides of the membrane. In this embodiment, hydrogen sulfur in the waste water is oxidized to sulfur at the surface of the membrane. The flow of oxygen or air on the other side of the membrane maintains the redox resin membrane at a high oxidation state.

It should also be pointed out that the process of the present invention may be refined through the repeated application of the present process to the treated waste water. Accordingly, the process of the present invention may also be practiced in a plurality of stages in which the treated product from one stage is supplied to the vessel of a subsequent stage.

The redox resin of the present invention may be prepared by polymerization of redox-active substances such as vinylhydroquinone or polymers containing redox-active substances such as quinones, benzoquinones, naphthoquinones, anthraquinones and others. Such a process is taught by Erzin, Updegraff and Cassidy in "Electrochange Polymer III. Polymers and Copolymers of Vinylhydroquinone", (Journal of the American Chemical Society, Vol. 75, page 1610 (1953). The redox resin may also be easily produced by attaching redox-active ions to ion exchange resins in an ion exchange process. Effective ions for oxidizing hydrogen sulfide to sulfur include organometallic compound such as iron complexed with chelating agents such as ethylenediaminetetraacetic acid (EDTA), N-hydroxyethylethylene diaminetriacetic acid (HEDTA), nitrilotriacetic acid (NTA), and diethylenetriaminepentaacetic acid (DPTA).

Removal of hydrogen sulfide and the production of elemental sulfur has been demonstrated in an experiment employing the redox resin prepared by equilibrating an ion exchange resin with a 0.1 molar sodium ferric/EDTA solution.

Accordingly, from the above, it may be appreciated that the method of the present invention achieves the objectives stated. In particular, the method of the present invention provides a means for the production of elemental sulfur from hydrogen sulfide containing solutions. Furthermore, the present invention provides for minimum loss of chemical quantities during the operation of the present invention. Because of the ability to restore the chemicals employed to a high oxidation state, the present invention results in a process having minimal material costs. Furthermore the cost of the equipment employed in the present invention is low. The method of the present invention results in negligible addition of chemical quantities to the treated solution. While those skilled in the art will recognize that oxidized sulfur species such as sulphate, sulphite and thiosulphate may nonetheless be present in the end product of the present invention, it will also be appreciated that the toxicity of the end product has been greatly reduced by the removal of $H_2S$. Finally, it is noted that the restoration of the redox resin catalyst to a high oxidation state is readily achieved through a low cost process which may employ air as the oxidizing fluid.

While the invention has been described in detail herein, in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for removing hydrogen sulfide from waste water and other aqueous solutions, comprising:
    passing said solution through a vessel containing at least one redox resin material having a high oxidation state, so as to contact said solution with said resin material said redox resin material comprising a membrane dividing said vessel into two volumes said solution being passed through a first of said volumes;
    passing an oxygenated fluid through the second of said volumes so as to contact said membrane and to increase the oxidation state of said redox resin.

2. The method of claim 1 further including the step of:
    separating elemental sulfur from the solution passed through said vessel.

3. The method of claim 2 in which said elemental sulfur is removed by filtration.

4. The method of claim 1 in which said oxidizing fluid is selected from the group consisting of humidified air and humidified oxygen.

5. The method of claim 1 in which said redox resin comprises polymerized redox-active material selected from the group consisting of vinylhydroquinones, quinones, benzoquinones, napthaquinones and anthraquinones.

6. The method of claim 1 in which said redox resin comprises a resin having polyvalent metal chelate ions attached to said resin.

7. The method of claim 6 in which said polyvalent metal chelate ions comprise a composition selected from the group consisting of ferric/EDTA, ferric/HEDTA, ferric/NTA and ferric/DPTA.

8. A method for removing hydrogen sulfide from waste water and other aqueous solutions, comprising:
    passing said solution through a vessel containing at least one redox resin material having a high oxidation state, so as to contact said solution with said resin material;
    ceasing the flow of solution through said vessel; and regenerating said redox resin material by passing an oxidizing fluid through said vessel, said fluid being selected from the group consisting of humidified air and humidified oxygen.

9. The method of claim 8 in which said redox resin material is disposed in the form of pellets contained within said vessel.

10. The method of claim 8 further including the step of simultaneously, with said passing step, passing an oxidizing fluid through said vessel so as to contact said redox resin material.

11. A method for removing hydrogen sulfide from waste water and other aqueous solutions, comprising:
    passing said solution through a vessel containing at least one redox resin material having a high oxidation state, so as to contact said solution with said resin material; and
    simultaneously with said passing step, regenerating said redox resin material by passing an oxidizing fluid through said vessel, said fluid being selected from the group consisting of humidified air and humidified oxygen.

* * * * *